(12) United States Patent
Itou

(10) Patent No.: US 8,674,540 B2
(45) Date of Patent: Mar. 18, 2014

(54) ELECTRONIC SYSTEM HAVING RESISTORS SERIALLY CONNECTED

(75) Inventor: Akito Itou, Kariya (JP)

(73) Assignee: Denso Corporation, Kariya (JP)

( * ) Notice: Subject to any disclaimer, the term of this patent is extended or adjusted under 35 U.S.C. 154(b) by 223 days.

(21) Appl. No.: 13/180,807

(22) Filed: Jul. 12, 2011

(65) Prior Publication Data

US 2012/0032503 A1 Feb. 9, 2012

(30) Foreign Application Priority Data

Aug. 5, 2010 (JP) ................................. 2010-176302

(51) Int. Cl.
- *B60L 1/00* (2006.01)
- *B60L 3/00* (2006.01)
- *H02G 3/00* (2006.01)

(52) U.S. Cl.
USPC ........... 307/9.1; 307/10.1; 320/116; 320/118; 320/122; 320/166; 320/167

(58) Field of Classification Search
USPC ......................................................... 307/9.1
See application file for complete search history.

(56) References Cited

U.S. PATENT DOCUMENTS

| | | | | |
|---|---|---|---|---|
| 8,169,782 | B2 * | 5/2012 | Takahashi et al. | 361/721 |
| 8,338,714 | B2 * | 12/2012 | Kang et al. | 174/252 |
| 2004/0004535 | A1 * | 1/2004 | Banerjee | 338/309 |
| 2010/0072574 | A1 * | 3/2010 | Ohshima | 257/536 |

FOREIGN PATENT DOCUMENTS

| | | |
|---|---|---|
| JP | 05-001286 | 1/1993 |
| JP | 2005-102464 | 4/2005 |
| JP | P2008-172862 A | 7/2008 |
| JP | 2010-56230 | 3/2010 |
| JP | 2010-73943 | 4/2010 |
| JP | P2010-118430 A | 5/2010 |
| WO | WO 2009/005108 | 1/2009 |

OTHER PUBLICATIONS

Japanese Office Action dated Jun. 14, 2012, issued in corresponding Japanese Application No. 2010-176302 with English translation.

* cited by examiner

*Primary Examiner* — Rexford Barnie
*Assistant Examiner* — Toan Vu
(74) *Attorney, Agent, or Firm* — Nixon & Vanderhye PC

(57) ABSTRACT

An electronic system has a capacitor that smoothes voltage of a direct current source, a resistance circuit that discharges charge of the capacitor, and an inverter circuit that converts the smoothed voltage into a three-phase ac voltage and applies this ac voltage to a motor. The resistance circuit has resistors and patterned wires disposed on a substrate such that the wires serially connect the resistors to discharge charge of the capacitor. The resistors are aligned in a straight line. The resistors located at positions different from ends of the series of resistors have resistance values lower than resistance values of the resistors located at respective ends of the series of resistors. More preferably, as the position of one resistor approaches the center of the series of resistors, the resistor is set at a lower the resistance value.

24 Claims, 6 Drawing Sheets

ELECTRONIC SYSTEM HAVING RESISTORS SERIALLY CONNECTED

CROSS-REFERENCE TO RELATED APPLICATION

This application is based upon and claims the benefit of priority of the prior Japanese Patent Application 2010-176302 filed on Aug. 5, 2010, so that the contents of which are incorporated herein by reference.

BACKGROUND OF THE INVENTION

1. Field of the Invention

The present invention relates to an electronic system having a resistance circuit in which a plurality of resistors are serially connected with each other.

2. Description of Related Art

As an electronic system capable of suppressing the increase in temperatures of electronic parts, an electronic circuit device has been disclosed in Published Japanese Patent First Publication No. 2010-73943. This device is provided with an electronic circuit chip, a base substrate and a thermal conductivity member. The chip is disposed on the substrate. The conductivity member is disposed between the chip and the substrate while being in contact with the chip and the substrate. Therefore, the conductivity member reduces thermal resistance in the route from the chip to the substrate. Accordingly, heat generated in the chip can be efficiently radiated to the outside, and increase in the temperature of the chip can be suppressed.

Hybrid vehicles have a motor control system in which a high voltage of a direct current source insulated from the vehicle body is changed to an alternating current voltage to apply this alternating current voltage to a vehicle driving motor. The control system is provided with a smoothing capacitor to smooth the high direct current voltage. When the operation of the control system is started, electric charge supplied from the source is accumulated in the capacitor so as to smooth the high direct current voltage. Thereafter, when the operation of the control system is ended, the source is disconnected from the capacitor, and the charge accumulated in the capacitor is maintained. Therefore, there is a probability that a person coming into contact with the capacitor receives an electric shock. To avoid this problem, under control of a microcomputer of the system, reactive power is supplied to the motor so as to generate no torque in the motor. Therefore, the charge accumulated in the capacitor is discharged. Further, in preparation for a failure occurring in the microcomputer, the control system is provided with a resistance circuit, and charge of the capacitor is discharged through the resistance circuit.

More specifically, the resistance circuit is disposed in parallel to the capacitor so as to always discharge charge of the capacitor at a low rate. To install the resistance circuit on a base substrate, a plurality of resistors having the same resistance values are aligned in a line on the substrate and are serially connected with one another as the resistance circuit. When the discharging current flows through the resistance circuit, each resistor generates heat. Therefore, temperature of each resistor is inevitably increased. Because heat radiating conditions of each resistor depend on the position of the resistor on the substrate and/or the relative position of the resistor to the resistance circuit, temperature of the resistor located at a low heat radiating position is considerably increased.

To suppress the increase in temperatures of the resistors, the structure of the electronic circuit device is applied for the control system. More specifically, a thermal conductivity member is disposed between the resistance circuit and the substrate while being directly in contact with bodies of the serially-connected resistors and the substrate. To heighten the thermal conductivity of the member, a metallic material such as copper is generally used. However, because bodies of the serially-connected resistors are in contact with the same metallic member, the insulation of each resistor from the other resistors cannot be obtained. That is, the motor control system cannot secure the distance for insulation among the resistors of the resistance circuit receiving high voltage.

SUMMARY OF THE INVENTION

An object of the present invention is to provide, with due consideration to the drawbacks of the conventional electronic circuit device, an electronic system, having a resistance circuit composed of a plurality of resistors serially connected with one another, which suppresses the increase in temperatures of the resistors while securing the insulation distance among the resistors.

According to an aspect of this invention, the object is achieved by the provision of an electronic system mounted on a vehicle, comprising a smoothing capacitor that accumulates charge of a direct current source insulated from a body of the vehicle to smooth a voltage of the direct current source, and a resistance circuit, having at least three resistors connected in series, that discharges the charge accumulated in the smoothing capacitor. The resistor or each of the resistors located at positions different from ends of the series of resistors of the resistance circuit has a resistance value lower than resistance values of the two resistors located on the respective ends of the series of resistors of the resistance circuit.

With this structure of the electronic system, when a discharged current flows through the resistance circuit, heat is generated in each of the resistors, and each of the resistors receives heat generated in the other resistors. In this case, heat received in each of the resistors located at positions different from the ends of the series of resistors is larger than heat received in any of the resistors located on the ends of the series of resistors. In this case, each of the two resistors located on the ends of the series of resistors can easily and rapidly radiate the heat generated and received in the resistor. In contrast, it is difficult to radiate the heat generated and received in each of the resistors located at positions different from the ends of the series of resistors. Therefore, assuming that resistance values of the resistors of the resistance circuit are the same, the temperature increase in the resistors located at positions different from the ends of the series of resistors becomes larger than the temperature increase in the resistors located on the ends of the series of resistors.

In the present invention, each resistor located at a position different from the ends of the series of resistors is set to have a resistance value lower than resistance values of the two resistors located on the respective ends of the series of resistors of the resistance circuit. In this case, electric power consumed in each resistor located at a position different from the ends of the series of resistors becomes smaller than electric power consumed in any of the resistors located on the ends of the series of resistors. Therefore, heat generated in each resistor from which it is difficult to radiate heat becomes smaller than heat generated in any resistor from which heat is easily radiated.

Accordingly, the temperature increase in each resistor from which it is difficult to radiate heat can be suppressed, and the increase in temperatures of the resistors of the resistance circuit can be suppressed within an allowable range.

Further, because the temperature increase in the resistors is suppressed, it is not required to receive heat in a thermal conductive metal, formed of a metallic material, being in contact with the resistors. Accordingly, even when a high voltage is applied to the resistance circuit, the insulation distance among the resistors can be reliably secured.

DETAILED DESCRIPTION OF THE PREFERRED EMBODIMENTS

Figure 1:
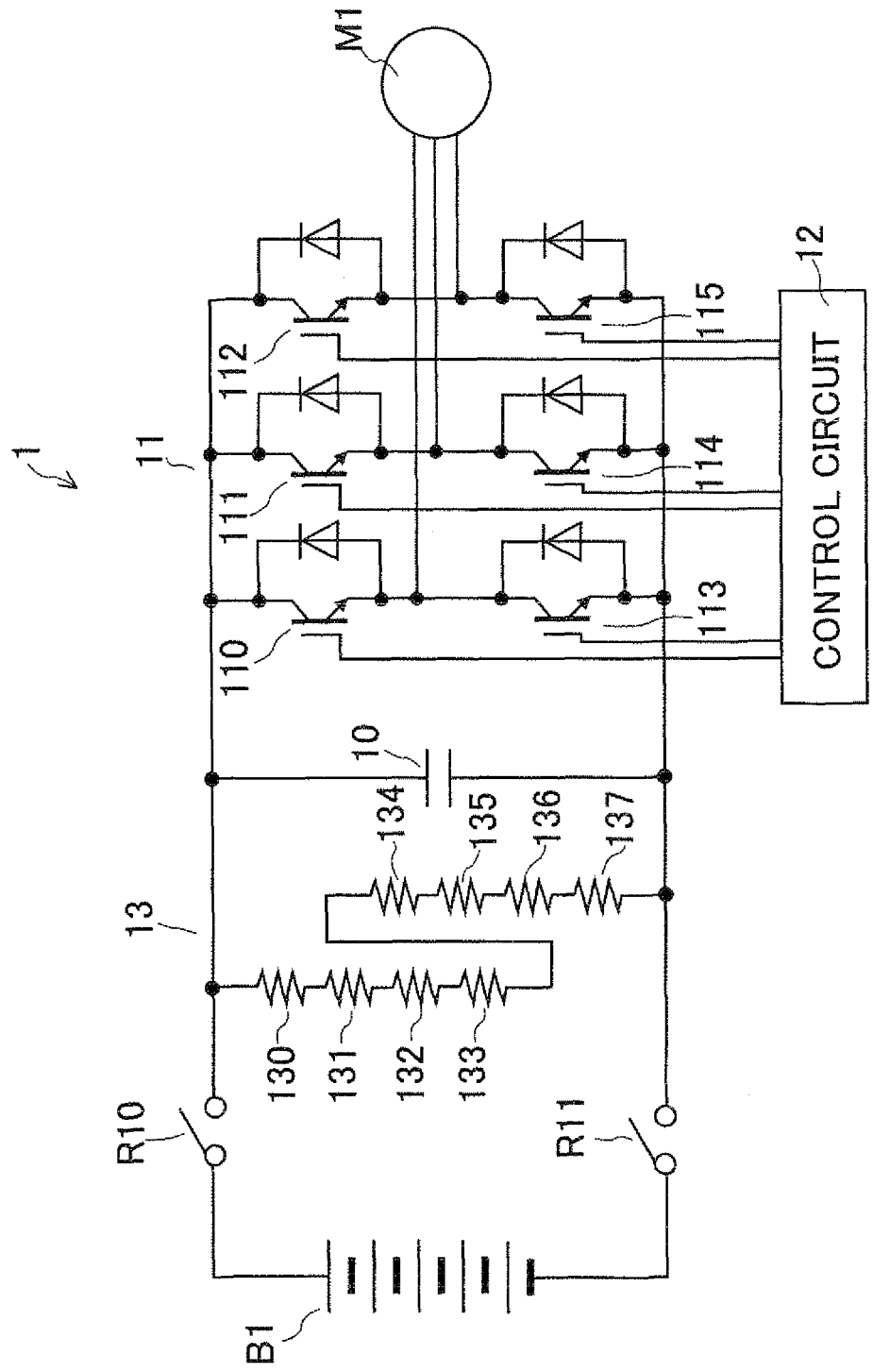
FIG. 1 is a circuit view of a motor control system representing an electronic system according to the first embodiment of the present invention.

Embodiments of the present invention will now be described with reference to the accompanying drawings, in which like reference numerals indicate like parts, members or elements throughout the specification unless otherwise indicated. In each embodiment, a motor control system is mounted on a vehicle as an electronic system according to the present invention to control a vehicle driving motor.

First Embodiment

FIG. 1 is a circuit view of a motor control system representing an electronic system according to the first embodiment. As shown in FIG. 1, a motor control system 1 converts a high direct current (dc) voltage (e.g., 288V) outputted from a high voltage battery B1 (i.e., a direct current source) into a three-phase alternating current (ac) voltage and applies this ac voltage to a vehicle driving motor M1 to control the motor M1. The battery B1 is insulated from the body of the vehicle. The control system 1 has a smoothing capacitor 10, an inverter circuit 11, a control circuit 12 and a resistance circuit 13.

The capacitor 10 accumulates electric charge supplied from the battery B1 to smooth the high dc voltage of the battery B1. The first end of the capacitor 10 is connected with the positive electrode of the battery B1 through a relay R10, while the second end of the capacitor 10 is connected with the negative electrode of the battery B1 through a relay R11.

The inverter circuit 11 converts the high dc voltage smoothed by the capacitor 10 to a three-phase ac voltage and applies this ac voltage to the motor M1. The circuit 11 has a plurality of n-p-n insulated-gate bipolar transistors (IGBTs) 110 to 115 and a plurality of diodes connected with the respective switching elements in parallel. The IGBTs 110 and 113 are serially connected with each other to form the u-phase of the ac voltage. The IGBTs 111 and 114 are serially connected with each other to form the v-phase of the ac voltage. The IGBTs 112 and 115 are serially connected with each other to form the w-phase of the ac voltage. More specifically, emitters of the IGBTs 110, 111 and 112 are connected with collectors of the IGBTs 113, 114 and 115, respectively. The group of IGBTs 110 and 113, the group of IGBTs 111 and 114 and the group of IGBTs 112 and 115 are connected with one another in parallel. Collectors of the IGBTs 110, 111 and 112 are connected with the first end of the capacitor 10, while emitters of the IGBTs 113, 114 and 115 are connected with the second end of the capacitor 10. Gates of the IGBTs 110 to 115 are connected with the control circuit 12. Serial connecting points of the group of IGBTs 110 and 113, the group of IGBTs 111 and 114 and the group of IGBTs 112 and 115 are connected with the motor M1.

The control circuit 12 outputs control signals to the bases of the respective IGBTs 110 to 115 according to an instruction received from the outside to control the IGBTs 110 to 115.

The resistance circuit 13 always discharges the charge of the capacitor 10 slowly. Therefore, after the operation of the system 1 is stopped, the circuit 13 prevents any person from receiving an electric shock from the capacitor 10. The resistance circuit 13 has a plurality of resistors 130, 131, 132, 133, 134, 135, 136 and 137 serially connected with one another in that order. The resistor 130 located at one end of the circuit 13 is connected with the first end of the capacitor 10, while the resistor 137 located at the other end of the circuit 13 is connected with the second end of the capacitor 10.

Figure 2:
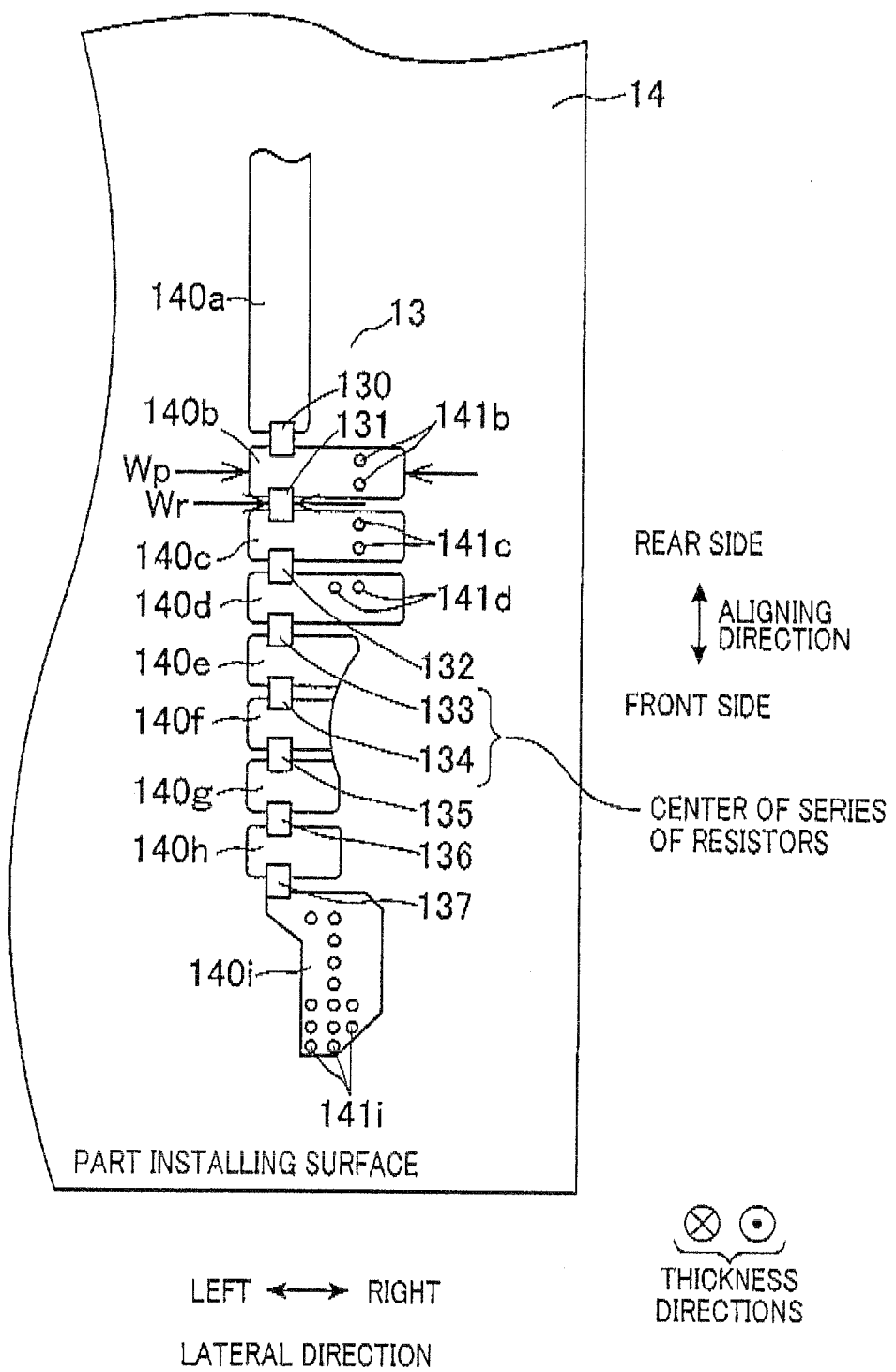
FIG. 2 is an enlarged view of patterned wires serially connecting resistors with one another on a surface of a substrate according to the first embodiment.
Figure 3:
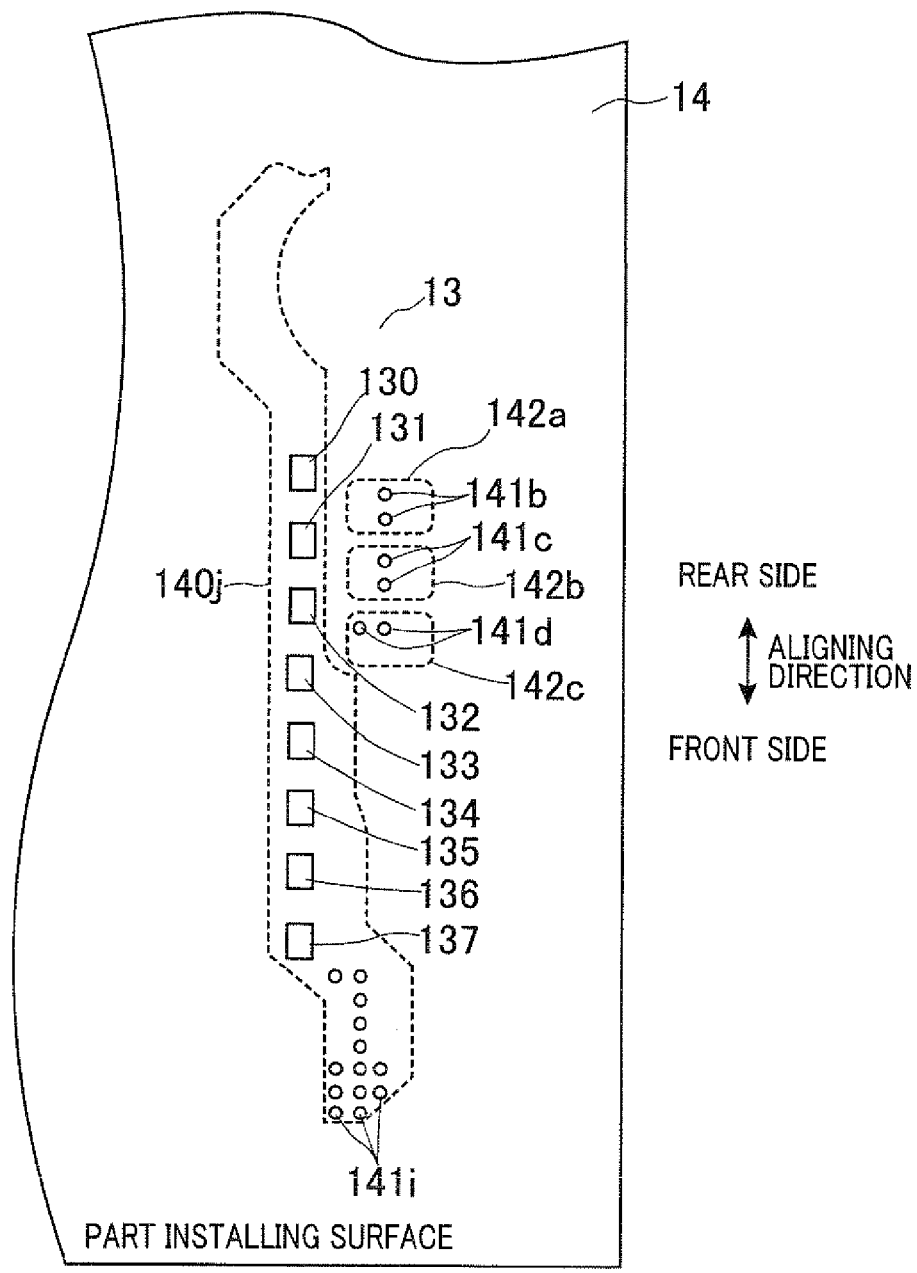
FIG. 3 is an enlarged view of patterned members (indicated by dotted lines) disposed on a surface of the substrate, when being seen from another surface of the substrate, according to the first embodiment.

The resistance circuit 13 installed on a substrate will be described with reference to FIG. 2 and FIG. 3. FIG. 2 is an enlarged view of patterned wires serially connecting the resistors 130 to 137 with one another on a part installing surface of the substrate according to the first embodiment, while FIG. 3 is an enlarged view of patterned members (indicated by dotted lines) disposed on a soldering surface of the substrate, when being seen from the part installing surface, according to the first embodiment. The front and rear sides in an aligning direction and the right and left in a lateral direction are defined for convenience of explanation.

As shown in FIG. 2 and FIG. 3, the resistance circuit 13 has a substrate 14 and a plurality of patterned wires 140a, 140b, 140c, 140d, 140e, 140f, 140g, 140h and 140i aligned in a line at equal intervals in that order from the rear side to the front side on a part installing surface of the substrate 14. The resistors 130 to 137 of the circuit 13 are disposed on the substrate 14 and the wires 140a to 140i on the part installing surface of the substrate 14. The resistors 130 to 137 are aligned substantially in a straight line at equal intervals along the aligning direction from the rear side to the front side in that order. The resistors 130 to 137 are chip resistors which have the same surface area on the substrate 14. The patterned wire 140a connects the resistor 130 and the first end of the capacitor 10. The patterned wires 140b to 140h connect the resistors 130 to 137 in series. The patterned wire 140i is connected with the resistor 137.

The resistance circuit 13 further has a patterned wire 140j and a plurality of patterned heat radiating members 142a, 142b and 142c on a soldering surface of the substrate 14 opposite to the part installing surface (see FIG. 3). The patterned wire 140j is connected with the second end of the capacitor 10. The patterned wire 140i has a plurality of via holes 141i which penetrate through the substrate 14 from the part installing surface to the soldering surface, and each via hole 141*i* is filled with a metallic material such as copper. The patterned wire 140*i* is connected with the patterned wire 140*j* through the material of the via holes 141*i*. Therefore, the resistor 137 is connected with the second end of the capacitor 10 through the wires 140*i* and 140*j*. The wires 140*a* to 141*j* and the radiating members 142*a* to 142*c* are, for example, made of a metallic material such as copper, aluminium or the like.

The length of the patterned wire 140*i* along the aligning direction is set to be larger than lengths of the wires 140*b* to 140*h*. Further, the patterned wire 140*j* is formed so as to face the resistors 130 to 137 through the substrate 14 along the thickness direction. Each of widths Wp of the wires 140*a* to 140*j* along the lateral direction is set to be larger than widths Wr of the resistors 130 to 137. The length of the patterned wire 140*a* along the aligning direction is set to be larger than lengths of the wires 140*b* to 140*h*. The patterned wires 140*b* to 140*d* are prolonged toward the right as compared with the patterned wires 140*e* to 140*h*, so that widths of the wires 140*b* to 140*d* along the lateral direction are larger than widths of the wires 140*e* to 140*h*.

The patterned wire 140*b* has a plurality of via holes 141*b*, the patterned wire 140*c* has a plurality of via holes 141*c*, and the patterned wire 140*d* has a plurality of via holes 141*d*. Each of the via holes 141*b* to 141*d* penetrates through the substrate 14 from the part installing surface to the soldering surface and is filled with a metallic material such as copper. The radiating member 142*a* is disposed so as to face the wire 140*b* through the substrate 14 along the thickness direction, and the patterned wire 140*b* is connected with the radiating member 142*a* through the material of the via holes 141*b* so as to transfer heat generated in the resistors 130 and 131 from the wire 140*b* to the radiating member 142*a*. The radiating member 142*b* is disposed so as to face the wire 140*c* through the substrate 14 along the thickness direction, and the patterned wire 140*c* is connected with the radiating member 142*b* through the material of the via holes 141*c* so as to transfer heat generated in the resistors 131 and 132 from the wire 140*c* to the radiating member 142*b*. The radiating member 142*c* is disposed so as to face the wire 140*d* through the substrate 14 along the thickness direction, and the patterned wire 140*d* is connected with the radiating member 142*c* through the material of the via holes 141*d* so as to transfer heat generated in the resistors 132 and 133 from the wire 140*d* to the radiating member 142*c*.

Next, the setting of resistances of the resistors 130 to 137 will be described. When a discharged current flows through the circuit 13, heat is generated in each of the resistors 130 to 137 so as to increase temperatures of the resistors 130 to 137. In this case, the resistor 130 located at one end of a resistor string (i.e., one end of the series of resistors 130 to 137) of the circuit 13 receives heat generated in the resistors 131 to 137 which are positioned only on the front side of the aligning direction. In the same manner, the resistor 137 located at the other end of the resistor string of the circuit 13 receives heat generated in the resistors 130 to 136 which are positioned only on the rear side of the aligning direction. In contrast, each of the resistors 131 to 136 located at positions different from any end of the resistor string of the circuit 13 receives heat generated in the other resistors which are positioned on both the front and rear sides of the aligning direction. Therefore, heat received in each of the resistors 130 and 137 are smaller than heat received in each of the resistors 131 and 136. Because of this positional relationship of the resistors 130 to 137, the heat generated and received in each of the resistors 130 and 137 can be rapidly and easily radiated to the outside of the control system 1 through the wires 140*a*, 140*b*, 140*h* and 140*i*. In contrast, it is difficult to radiate the heat generated and received in each of the resistors 131 and 136 to the outside.

In this case, assuming that all the resistors 130 to 137 have the same resistance value, the resistors 130 to 137 generate heat at the same rate, and the temperature increase in each of the resistors 131 to 136 becomes larger than the temperature increase in each of the resistors 130 and 137. To suppress temperature increases in the resistors 130 to 137 within a predetermined range when the resistance circuit 13 consumes the electric power of the capacitor 10 at a predetermined rate, resistance values of the resistors 131 to 136 located at positions different from any end of the resistor string of the circuit 13 are set to be lower than resistance values of the resistors 130 to 131 located at the respective ends of the resistor string of the circuit 13.

Further, as the position of one resistor of the circuit 13 approaches the center of the resistor string (i.e., the center of the series of resistors 130 to 137) of the circuit 13, heat received in the resistor from the other resistors is increased, and it becomes more difficult to radiate the heat generated and received in the resistor to the outside. In this embodiment, to more reliably suppress temperature increases of the resistors 130 to 137 within an allowable range when the resistance circuit 13 consumes the electric power of the capacitor 10 at a predetermined rate, as the position of one resistor of the circuit 13 approaches the center of the resistor string of the circuit 13, the resistor is set at a lower resistance value. In other words, in addition to the setting of the resistors 130 and 137 at the highest resistance values among resistance values of the resistors 130 to 137, as the position of one resistor of the circuit 13 located at a position different from any end of the resistor string of the circuit 13 approaches the center of the resistor string of the circuit 13, the resistor is set at a lower resistance value.

More specifically, resistance values of the resistors 131 and 136 are set to be higher than resistance values of the other resistors 132 to 135, and resistance values of the resistors 132 and 135 are set to be equal to or higher than resistance values of the resistors 133 and 134. The resistors 133 and 134 located in the center of the resistor string of the circuit 13 are set at the minimum resistance values.

To set the resistors 130 to 137 at predetermined resistances, the thickness of the resistors 130 to 137 are, for example, adjusted. For example, resistance values of the resistors 130 to 137 are set at 51Ω, 27Ω, 22Ω, 20Ω, 20Ω, 20Ω, 24Ω and 27Ω, respectively. In this case, when the circuit 13 consumes electric power at a predetermined rate of 1.1 W so as to radiate heat to the outside of the circuit 13, temperature increases of the resistors 130 to 137 are suppressed within an allowable range from 30 degrees to 33 degrees.

Next, an operation of the motor control system 1 will be described with reference to FIG. 1. When an ignition switch (not shown) of the vehicle is turned on, the relays R10 and R11 are turned on, and an operation of the control system 1 is started. In response to the turned-on relays R10 and R11, the high dc voltage of the battery B1 is smoothed in the capacitor 10, and the control circuit 12 controls switching operations of the IGBTs 110 to 115 composing the inverter circuit 11. In these switching operations, the circuit 11 converts the high dc voltage smoothed by the capacitor 10 into a three-phase ac voltage and applies this ac voltage to the motor M1. Therefore, the system 1 can control the motor M1.

Further, because the length of the wire 140*a* is larger than lengths of the wires 140*b* to 140*h*, heat generated in the resistor 130 is efficiently radiated through the wire 140*a* at a high heat radiation rate. Because the wires 140*b* to 140*d* are prolonged along the lateral direction, heat generated in the resistors 130 to 133 is efficiently radiated through the wires 140b to 140d at a high heat radiation rate. Because the wire 140i is prolonged along the aligning direction, heat generated in the resistor 137 is efficiently radiated through the wire 140i at a high heat radiation rate. Because the wire 140j faces the resistors 130 to 137 through the substrate 14 along the thickness direction, heat generated in the resistors 130 to 137 can be efficiently radiated to the outside of the control system 1 through the substrate 14 and the wire 140j at a high heat radiation rate. Therefore, the wire 140j also acts as a heat radiating member.

Thereafter, when the ignition switch is turned on, the relays R10 and R11 are turned off, and the operation of the control system 1 is stopped. Therefore, the charge accumulated in the capacitor 10 at the high voltage remains. In this case, because the resistance circuit 13 always discharges the charge of the capacitor 10 slowly, the accumulated charge is soon dissipated. Therefore, the control system 1 can prevent any person from receiving an electric shock.

Next, the increase in the temperature of the resistors 130 to 137 of the resistance circuit 13 will be described. When a discharged current flows through the circuit 13, heat is generated in each of the resistors 130 to 137, and temperatures of the resistors 130 to 137 are increased. As shown in FIG. 2 and FIG. 3, the resistors 130 to 137 are aligned in a straight line at equal intervals so as to differentiate a heat receiving rate of each resistor from heat receiving rates of the other resistors. Therefore, resistance values of the resistors 130 to 137 are, respectively, set at 51Ω, 27Ω, 22Ω, 20Ω, 20Ω, 20Ω, 24Ω and 27Ω so as to suppress increased temperatures of the resistors 130 to 137 within an allowable range. The total resistance value of the circuit 13 is 211Ω.

Experimental results of the temperature increase in the resistors 130 to 137 according to this embodiment were measured when the circuit 13 consumed electric power at a predetermined rate of 1.1 W. Further, as a comparative example based on the prior art, the resistors 130 to 137 were, respectively, set at the same resistance value of 27Ω so as to set the total resistance value of the circuit 13 at 216Ω. Experimental results in the comparative example were also measured when the circuit 13 consumed power at the rate of 1.1 W. Experimental results according to this embodiment and experimental results of the comparative example are shown in Table 1.

TABLE 1

| | First Embodiment | | Comparative Example | |
|---|---|---|---|---|
| | Resistance Values (Ω) | Temperature Increases (deg.) | Resistance Values (Ω) | Temperature Increases (deg.) |
| R130 | 51 | 31 | 27 | 27 |
| R131 | 27 | 32 | 27 | 35 |
| R132 | 22 | 32 | 27 | 38 |
| R133 | 20 | 32 | 27 | 41 |
| R134 | 20 | 32 | 27 | 41 |
| R135 | 20 | 32 | 27 | 41 |
| R136 | 24 | 32 | 27 | 40 |
| R137 | 47 | 31 | 27 | 32 |

As shown in Table 1, in the experimental results according to this embodiment, temperature increases in the resistors 130 to 137 were within the narrow range from 31 to 32 degrees. Therefore, temperature increases in the resistors 130 to 137 were within the allowable range from 30 degrees to 33 degrees. In contrast, in the comparative example, temperature increases in the resistors 130 to 137 were widely ranged from 27 degrees to 41 degrees.

Next, effects in this embodiment will be described.

Each of the resistors 130 and 137 located at the ends of the circuit 13 receives heat from the other resistors located only on one side of the series of resistors 130 to 137, so that the resistor can easily radiate the heat, generated and received in the resistor, to the outside of the control system 1 through the wires 140a and 140b or the wires 140i and 140j connected to the resistor. In contrast, each of the resistors 131 to 136 located at positions different from any end of the series of resistors 130 to 137 receives heat from the other resistors located on the front and rear sides. Therefore, it is difficult to radiate the heat generated and received in each of the resistors 131 to 136 to the outside. To suppress temperature increases in the resistors 130 to 137, resistance values of the resistors 131 to 136 are set to be lower than resistance values of the resistors 130 and 137. Therefore, heat generated in each of the resistors 131 to 136, from which it is difficult to radiate heat to the outside, becomes lower than heat generated in each of the resistors 130 and 137 from which heat is easily radiated to the outside.

Accordingly, not only the temperature increase in the resistors 130 and 137 can be suppressed within the allowable range, but also the temperature increase in the resistors 131 to 136 can be suppressed within the allowable range.

Further, none of bodies of the resistors 130 to 137 is in contact with the same thermal conductive member, but each of the wires 140b to 140h are located only between two resistors of the circuit 13. Therefore, the control system 1 can secure the insulation distance among the resistors 130 to 137 of the circuit 13 receiving the high voltage.

Accordingly, the control system 1, having the resistance circuit 13 composed of the resistors 130 to 137 serially connected with one another, can suppress the increase in temperatures of the resistors 130 to 137 while securing the insulation distance among the resistors 130 to 137.

Further, it is most difficult to radiate heat from the resistors 133 and 134, located in the center of the resistor string of the circuit 13, to the outside. However, in this embodiment, each of the resistors 133 and 134 is set to have the lowest resistance value (e.g., 20Ω). Therefore, heat generated in each of the resistors 133 and 134, from which it is most difficult to radiate heat, can be most decreased, so that the temperature increase in the resistors 130 to 137 can be reliably suppressed within a predetermined range.

Moreover, as the position of one resistor of the circuit 13 approaches the center of the resistor string of the circuit 13, heat received in the resistor from the other resistors is increased, and it becomes more difficult to radiate the heat generated and received in the resistor to the outside. To compensate for the increase of the received heat, in this embodiment, as the position of one resistor of the circuit 13 approaches the center of the resistor string of the circuit 13, the resistor is set at a lower resistance value so as to decrease heat generated in the resistor. Accordingly, not only the temperature increase in the resistors 130 and 137 can be suppressed, but also the temperature increase in the resistors 131 to 136 can be reliably suppressed within a predetermined range.

Furthermore, the resistance values of the resistors 130 to 137 are set such that temperature increases in the resistors 130 to 137 of the circuit 13 consuming electric power at a predetermined rate are placed within the allowable range. Accordingly, temperatures of the resistors 130 to 137 can be uniformly increased within the allowable range.

Still further, widths of the wires 140a to 140j are set to be larger than widths of the resistors 130 to 137. Accordingly, heat of the resistors 130 to 137 can be efficiently radiated through the wires 140a to 140j.

Still further, the resistance circuit 13 further has the wire 140j connected with the wire 140i. Accordingly, heat generated in the resistor 137 can be efficiently radiated through the wires 140i and 140j. Further, the wire 140j is disposed on the soldering surface of the substrate 14 so as to face the resistors 130 to 137 through the substrate 14. Accordingly, heat generated in the resistors 130 to 137 can be efficiently radiated through the wire 140j.

Still further, the resistance circuit 13 further has the radiating members 142a, 142b and 142c connected with the wires 140b, 140c and 140d, respectively. Accordingly, heat generated in the resistor 130 to 133 can be efficiently radiated through the radiating members 142a, 142b and 142c, in addition to the heat radiation through the wires 140b, 140c and 140d.

Still further, the length of the wire 140a along the aligning direction is larger than lengths of the wires 140b to 140h. Accordingly, heat generated in the resistor 130 can be efficiently radiated through the wire 140a.

In this embodiment, the resistance circuit 13 has eight resistors serially connected with one another. However, this embodiment should not be construed as limiting the present invention to the structure of this embodiment. The circuit 13 may have at least three serially-connected resistors. In this case, resistance values of resistors located at the ends of the circuit 13 are set to be higher than resistance values of the other resistors, and resistors located in the center of the resistor string of the circuit 13 are set at the lowest resistance value. Further, the circuit 13 may have at least five serially-connected resistors. In this case, as the position of one resistor located at a position different from any end of the circuit 13 approaches the center of the resistor string of the circuit 13, the resistor is set at a lower resistance value. Therefore, in the same manner as in this embodiment, the temperature increase of the resistors can be uniformly suppressed.

Further, in this embodiment, as the position of one resistor of the circuit 13 approaches the center of the resistor string of the circuit 13, the resistor is set at a lower resistance value. However, the resistors 131 to 136 located at positions different from any end of the resistor string of the circuit 13 may have the same resistance value while the two resistors 130 and 137 located at the ends of the resistor string of the circuit 13 are set at resistance values higher than resistance values of the other resistors 131 to 136. With this structure of the control system 1, the control system 1 can suppress the increase in temperatures of the resistors 130 to 137 within a predetermined range.

Moreover, in this embodiment, the resistor 134 adjacent to the resistor 133 located in the center of the resistor string of the circuit 13 has the same resistance value as the resistance value of the resistor 133. However, the resistor 134 may have a resistance value higher than the resistance value of the resistor 133. In this case, as the position of one resistor of the circuit 13 approaches the center of the resistor string of the circuit 13, the resistor is definitely set at a lower resistance value.

Furthermore, in this embodiment, the resistance values of the resistors 130 to 137 are set such that temperature increases in the resistors 130 to 137 of the circuit 13 consuming electric power at a predetermined rate are placed within the allowable range. However, the resistance values of the resistors 130 to 137 may be set such that temperatures of the resistors 130 to 137 of the circuit 13 consuming electric power at a predetermined rate are increased substantially by the same value. In this case, temperature increases in the resistors 130 to 137 can be most suppressed.

Still further, in this embodiment, the particular wires 140b to 140d have the same number of via holes. However, as the position of one particular wire approaches the center of the resistor string of the circuit 13, the number of via holes in the particular wire may be increased. In this case, as heat received in the particular wire from the other wires is increased, the particular wire can more efficiently transfer heat to the corresponding heat radiating member 142a, 142b or 142c. Accordingly, temperature increases of the particular wires can be more reliably suppressed within a predetermined range.

Still further, in this embodiment, the resistors 130 to 137 are aligned in a straight line. However, the resistors 130 to 137 may be aligned along a curved line.

Figure 6:
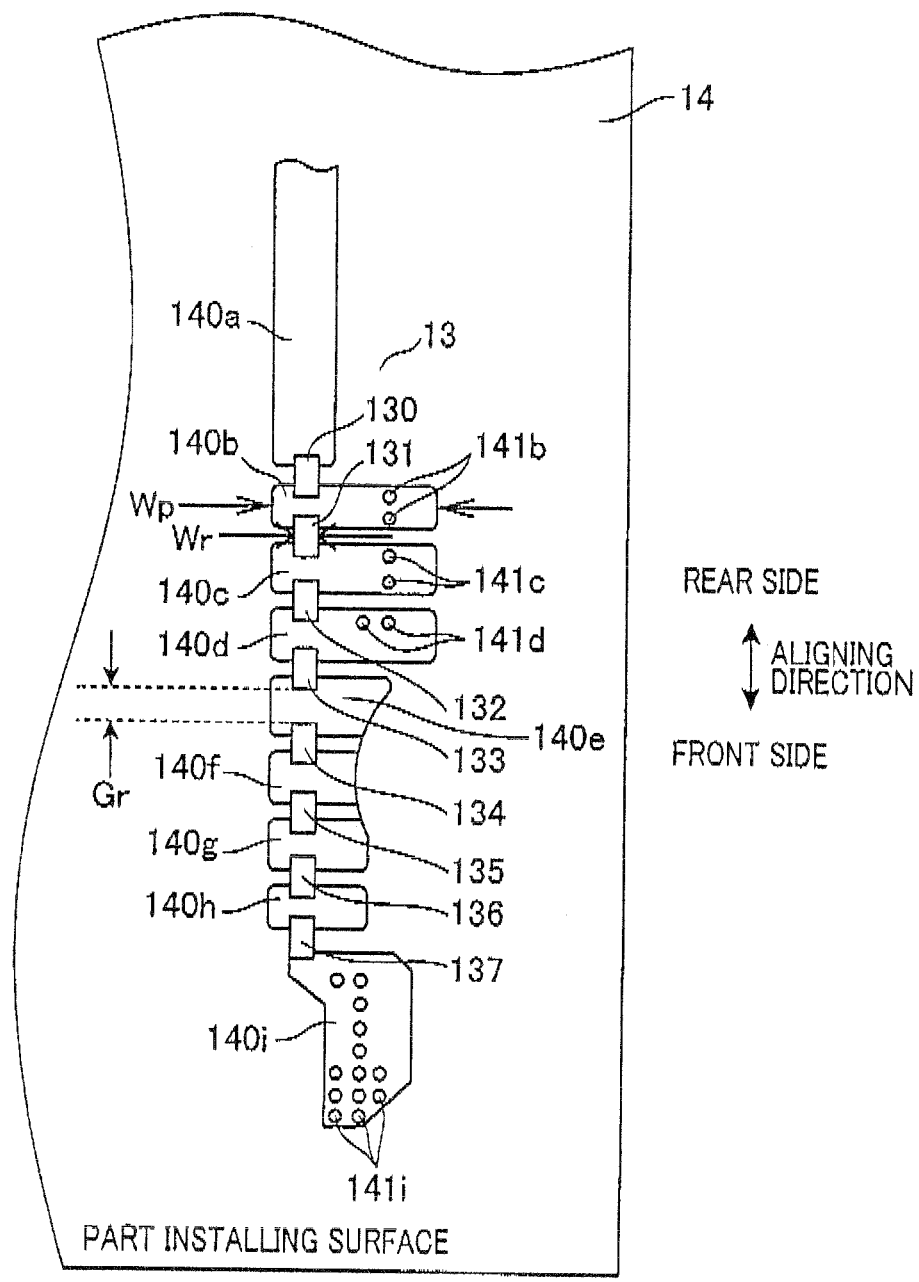
FIG. 6 is an enlarged view of patterned wires serially connecting resistors with one another on a surface of a substrate according to another embodiment.

Still further, in this embodiment, the resistors 130 to 137 are disposed at equal intervals. However, as the position of the gap between two resistors approaches the center of the resistor string of the circuit 13, the interval between the resistors may be lengthened. In this case, as the position of one particular resistor approaches the center of the resistor string of the circuit 13, the distance from the particular resistor to adjacent resistors is lengthened so as to decrease the heat received from the adjacent resistors (refer to FIG. 6). Accordingly, the temperature increase in the resistors located near the center of the resistor string of the circuit 13 can be further reliably suppressed.

Still further, in this embodiment, the resistors 130 to 137 are set so as to have the same surface area. However, surface areas of resistors not located on any end of the circuit 13 may be larger than surface areas of resistors located at the ends of the resistor string of the circuit 13. In this case, the heat radiation rate from the resistor located at a position different from any end of the circuit 13 can be increased, and the temperature increase in the resistor located at a position different from any end of the circuit 13 can be further reliably suppressed.

Still further, in this embodiment, the patterned wires 140a to 140j and the patterned heat radiating members 142a to 142c are formed on the part installing surface and the soldering surface of the substrate 14. However, the wires 140a to 140j and the members 142a to 142c may be formed into the substrate 14 as patterned inner layers of the substrate 14. In this case, the resistors 130 to 137 are formed on one surface of the substrate 14 so as to be connected with the inner layers.

Still further, in this embodiment, the resistance circuit 13 has one series of resistors 130 to 137. However, the circuit 13 may have many serial resistor blocks connected with one another in parallel while each serial resistor block is composed of a series of resistors. In this case, the rate of the consumed electric power in the circuit 13 can be increased.

Still further, in this embodiment, the widths of the patterned wires 140a to 140j along the lateral direction are larger than the widths of the resistors 130 to 137. However, when all the surface area of each resistor not being in contact with the substrate 14 or any wire is called an exposed surface area, the surface area of each wire on the part installing surface of the substrate 14 may be larger than the exposed surface area of each of the resistors adjacent to the wire. In this case, in the same manner as in the first embodiment, heat generated in each resistor can be efficiently radiated to the outside through the adjacent wires.

Second Embodiment

Figure 4:
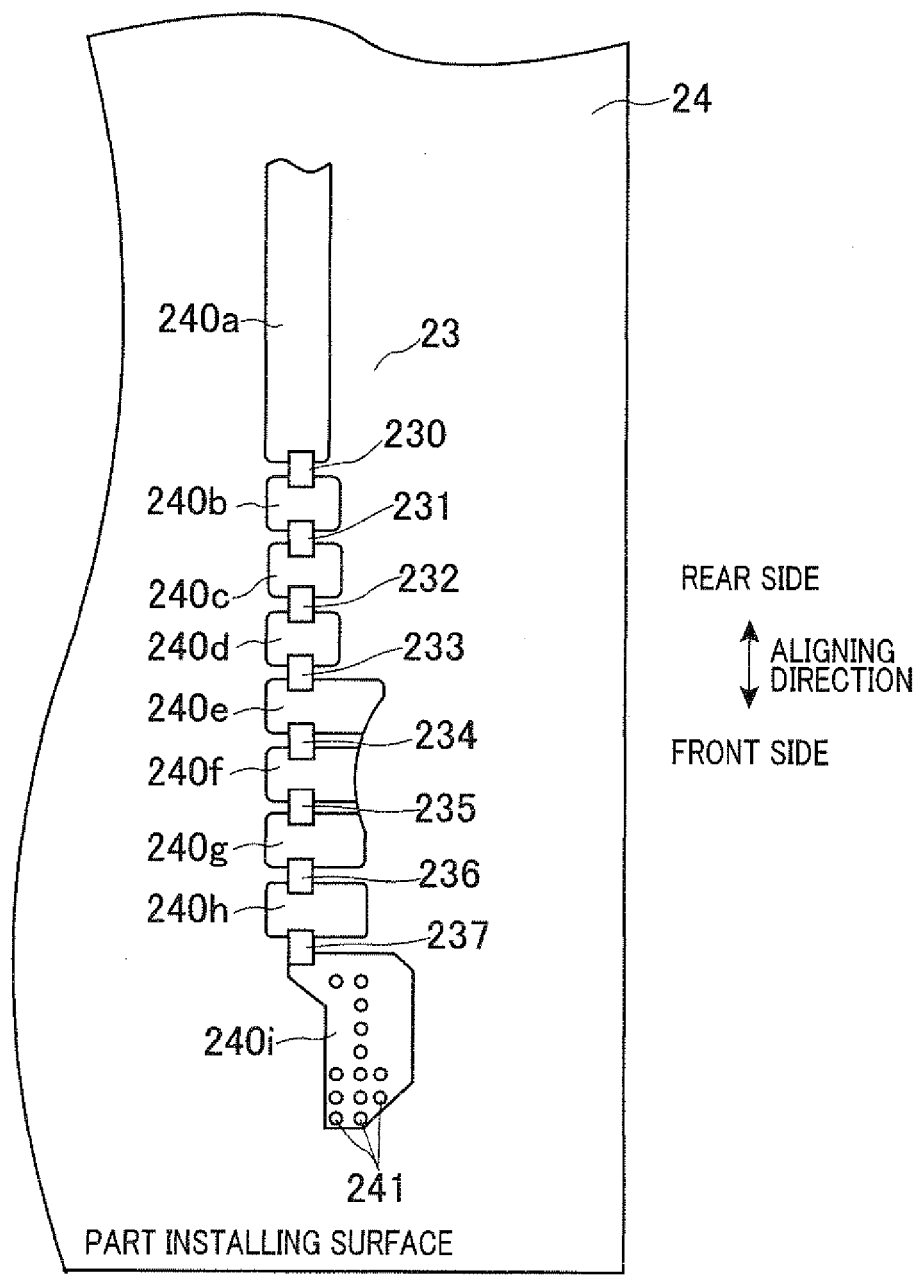
FIG. 4 is an enlarged view of patterned wires serially connecting resistors with one another on a surface of a substrate according to the second embodiment of the present invention.
Figure 5:
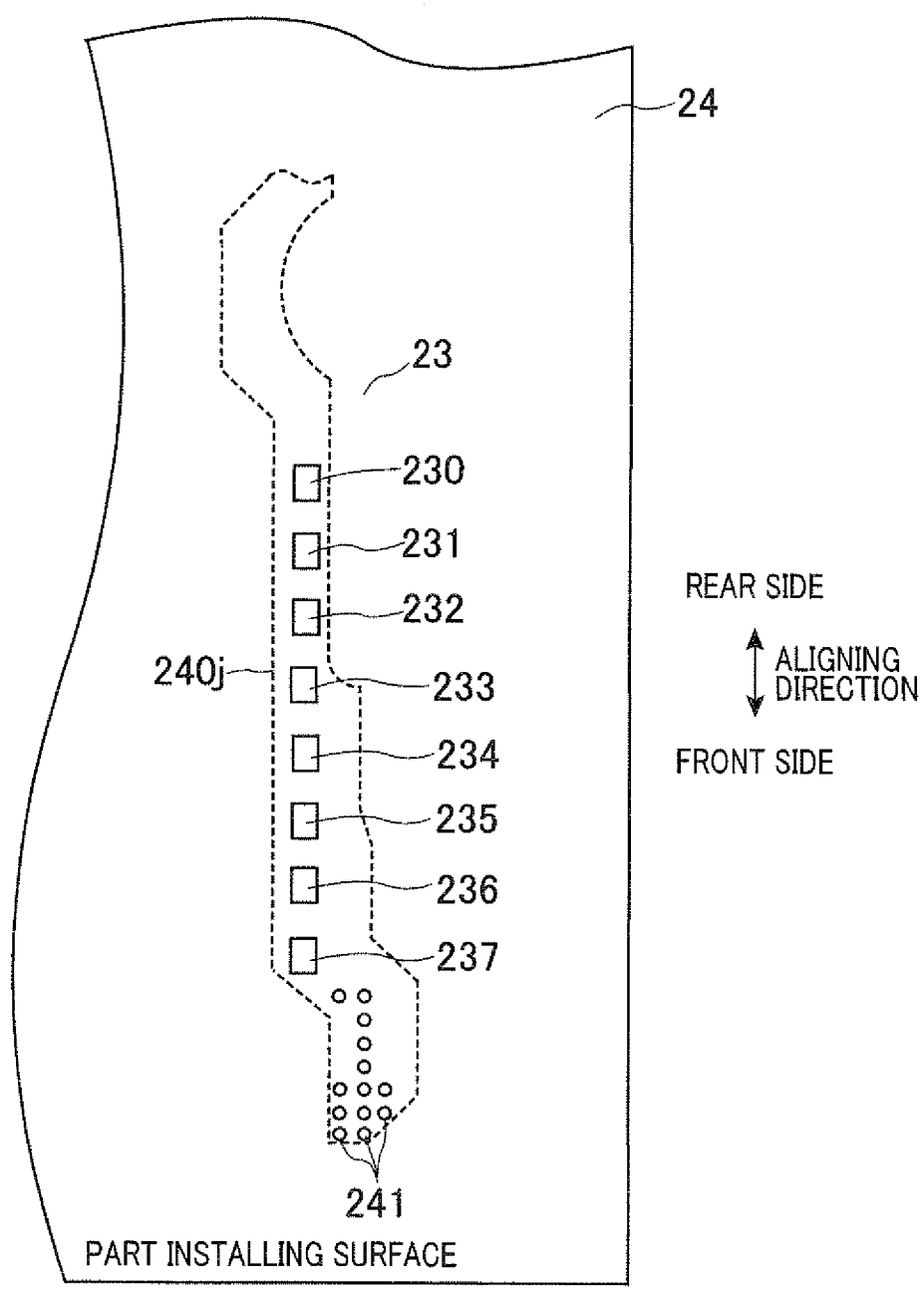
FIG. 5 is an enlarged view of a patterned member (indicated by a dotted line) disposed on a surface of a substrate, when being seen from another surface of the substrate, according to the second embodiment.

FIG. 4 is an enlarged view of patterned wires serially connecting resistors of the circuit 13 on the part installing surface of the substrate 14 according to the second embodiment, while FIG. 5 is an enlarged view of a patterned member (indicated by a dotted line) disposed on the soldering surface of the substrate 14, when being seen from the part installing surface, according to the second embodiment. The front and rear sides in the aligning direction and the right and left in the lateral direction are defined for convenience of explanation.

As shown in FIG. 4 and FIG. 5, the control system 1 having the capacitor 10, the inverter circuit 11 and the control circuit 12 has a resistance circuit 23 in place of the resistance circuit 13. The circuit 23 has a plurality of patterned wires 240a, 240b, 240c, 240d, 240e, 240f, 240g, 240h and 240i disposed on the part installing surface of the substrate 14 while aligning the wires 240a to 240i in a line at equal intervals from the rear side to the front side in that order. The circuit 23 has a plurality of resistors 230, 231, 232, 233, 234, 235, 236 and 237 disposed on the wires 240a to 240i and the substrate 14 on the part installing surface of the substrate 14 while aligning the resistors 230 to 237 substantially in a straight line at equal intervals in that order along the aligning direction from the rear side to the front side. The wires 240a to 240i serially connect the resistors 230 to 237 with one another. The resistors 230 to 237 are chip resistors having the same surface area on the substrate 14.

The wire 240a connects the resistor 230 and the first end of the capacitor 10. The wires 240b to 240i connect the resistors 230 to 237 in series. The resistance circuit 23 further has a patterned wire 240j on the soldering surface of the substrate 14. The wire 240i has a plurality of via holes 241 packed with a metallic material so as to be connected with the wire 240j. Therefore, the resistor 237 is connected with the second end of the capacitor 10 through the wires 240i and 240j. The wires 240a to 241j are, for example, made of a metallic material such as copper, aluminium or the like.

Shapes of the wires 240a, 240e, 240f, 240g, 240h, 240i and 240j are the same as shapes of the wires 140a, 140e, 140f, 140g, 140h, 140i and 140j shown in FIG. 2 and FIG. 3, respectively. In contrast, widths of the wires 240b to 240d along the lateral direction are smaller than widths of the wires 140b to 140d shown in FIG. 2.

Resistances of the resistors 230 to 237 are set at predetermined values. The resistors 230 and 237 located at both ends of the circuits 23 have resistance values higher than resistance values of the resistors 231 to 236 disposed between the resistors 230 and 237. As the position of one resistor of the circuit 23 approaches the center of the resistor string of the circuit 23, the resistor is set at a lower resistance value. The resistors 233 and 234 disposed in the center of the resistor string of the circuit 24 have lowest resistance values among resistance values of the resistors 230 to 237.

Further, the resistance circuit 23 always consumes the electric power of the capacitor 10 little by little, and temperatures of the resistors 230 to 237 are increased. Resistances of the resistors 230 to 237 are set such that temperatures of the resistors 230 to 237 are increased within an allowable range when the circuit 23 consumes the electric power of the capacitor 10 at a predetermined rate.

Because the circuit 23 has the wires 240b to 240d, of which widths are smaller than widths of the wires 140b to 140d shown in FIG. 2, and has no heat radiating member on the soldering surface of the substrate 14, the relation among heat radiation rates of the resistors 230 to 237 differs from the relation among heat radiation rates of the resistors 130 to 137. Therefore, even when the consumed power rate in the circuit 23 is the same as the consumed power rate in the circuit 13, resistance values of the resistors 230 to 237 according to the second embodiment differ from resistance values of the resistors 130 to 137 according to the first embodiment.

Accordingly, because resistances of the resistors 230 to 237 are set such that temperatures of the resistors 230 to 237 are increased within an allowable range when the circuit 23 consumes the electric power of the capacitor 10 at a predetermined rate, the control system 1 can suppress the increase in temperatures of the resistors 230 to 237.

Further, because the resistors 230 to 237 are connected with the wires 240a to 240i separated from one another, the control system 1 can secure the insulation distance among the resistors 230 to 237.

Moreover, because widths of the patterned wires 240b to 240d are shortened as compared with widths of the patterned wires 140b to 140d while no heat radiating members connected with the patterned wires 240b to 240d are disposed on the soldering surface of the substrate 14, the area occupied by the patterned wires and members can be decreased.

What is claimed is:

1. An electronic system mounted on a vehicle, comprising:
a smoothing capacitor that smooths a voltage of a direct current source insulated from a body of the vehicle; and
a resistance circuit, having at least three resistors connected in series, that discharges the charge accumulated in the smoothing capacitor,
wherein:
the at least three resistors connected in series are located at respective intervals, connected to respective patterned wires which are formed on a substrate, being disposed on the respective patterned wires; and
the resistor or each of the resistors, located at a position or positions different from ends of the series of resistors of the resistance circuit, is set to have a respective resistance value lower than resistance values of the two resistors located at the respective ends of the series of resistors.

2. An electronic system mounted on a vehicle, comprising:
a smoothing capacitor that smooths a voltage of the direct current source insulated from a body of the vehicle; and
a resistance circuit, having at least three resistors connected in series, that discharges the charge accumulated in the smoothing capacitor,
wherein:
the resistor or each of the resistors, located at a position or positions different from ends of the series of resistors, is set to have resistance value lower than resistance values of the two resistors located at the ends of the series of resistors of the resistance circuit;
the electronic system has a plurality of patterned wires connecting the resistors serially, the patterned wires being formed on a substrate, the resistors being disposed on the patterned wires; and
the widths of the patterned wires are larger than widths of the resistors.

3. An electronic system mounted on a vehicle, comprising:
a smoothing capacitor that smooths a voltage of the direct current source insulated from a body of the vehicle; and
a resistance circuit, having at least three resistors connected in series, that discharges the charge accumulated in the smoothing capacitor,
wherein:
the electronic system has a plurality of patterned wires connecting the resistors serially, the patterned wires being formed on a substrate, the resistors being disposed on the patterned wires;
the widths of the patterned wires are larger than widths of the resistors;

the patterned wires have a plurality of via holes which penetrate through the substrate; and the number of via holes in the particular patterned wire is increased as a position of the particular patterned wire approaches a center of the series of resistors.

4. An electronic system mounted on a vehicle, comprising:
a smoothing capacitor that smooths a voltage of the direct current source insulated from a body of the vehicle;
a resistance circuit, having at least three resistors connected in series, that discharges charge accumulated in the smoothing capacitor; and
a controller that controls a vehicle driving motor,
wherein:
the at least three resistors connected in series are located at respective intervals, connected to respective patterned wires which are formed on a substrate, being disposed on the respective patterned wires; and
the resistor or each of the resistors, located at a position or positions different from ends of the series of resistors of the resistance circuit, is set to have a resistance value lower than resistance values of the two resistors located at the respective ends of the series of resistors of the resistance circuit.

5. The electronic system according to claim 1, wherein the resistor located in a center of the series of resistors is set at a lowest resistance value among the resistance values of the resistors.

6. The electronic system according to claim 1, wherein the number of resistors of the resistance circuit is five or more, and the resistance value of the resistor located at the position different from either end of the series of resistors is decreased as the position of the resistor approaches a center of the series of resistors.

7. The electronic system according to claim 1, wherein the respective resistance values of the resistors are set such that temperature increases in the resistors are within an allowable range when the resistors consume electric power at a predetermined rate.

8. The electronic system according to claim 7, wherein the respective resistance values of the resistors are set such that the temperatures of the resistors are increased by the same value when the resistors consume electric power at the predetermined rate.

9. The electronic system according to claim 2, wherein the patterned wires have a plurality of via holes which penetrate through the substrate.

10. The electronic system according to claim 9, wherein the number of via holes in the particular patterned wire is increased as a position of the particular patterned wire approaches a center of the series of resistors.

11. The electronic system according to claim 2, wherein the electronic system has a patterned heat radiating member formed on the substrate.

12. The electronic system according to claim 11, wherein the patterned heat radiating member is connected with the patterned wire through the via holes of the patterned wire.

13. The electronic system according to claim 11, wherein the patterned heat radiating member is formed on a surface of the substrate opposite to the surface on which the resistors are disposed.

14. The electronic system according to any claim 9, wherein a gap between two resistors is widened as the gap approaches the center of the series of resistors.

15. The electronic system according to claim 1, wherein surface areas of the resistors located at positions different from any end of the series of resistors are set to be larger than surface areas of the resistors located at respective ends of the series of resistors.

16. The electronic system according to claim 3, wherein the electronic system has a patterned heat radiating member formed on the substrate.

17. The electronic system according to claim 16, wherein the patterned heat radiating member is connected with the patterned wire through the via holes of the patterned wire.

18. The electronic system according to claim 16, wherein the patterned heat radiating member is formed on a surface of the substrate opposite to the surface on which the resistors are disposed.

19. The electronic system according to claim 3, wherein a gap between two resistors is widened as the gap approaches the center of the series of resistors.

20. The electronic system according to claim 2, wherein surface areas of the resistors located at positions different from any end of the series of resistors are set to be larger than surface areas of the resistors located at respective ends of the series of resistors.

21. The electronic system according to claim 3, wherein surface areas of the resistors located at positions different from any end of the series of resistors are set to be larger than surface areas of the resistors located at respective ends of the series of resistors.

22. The electronic system according to claim 4, wherein surface areas of the resistors located at positions different from any end of the series of resistors are set to be larger than surface areas of the resistors located at respective ends of the series of resistors.

23. The electronic system according to claim 2, further comprising a controller that controls a vehicle driving motor.

24. The electronic system according to claim 3, further comprising a controller that controls a vehicle driving motor.

* * * * *